No. 674,155. Patented May 14, 1901.
W. H. BAKER & F. E. KIP.
WEFT REPLENISHING MECHANISM FOR LOOMS.
(Application filed Apr. 23, 1900.)
(No Model.) 7 Sheets—Sheet 1.

WITNESSES:
J. W. Wiman
Peter N. Ross

INVENTORS:
William H. Baker
Frederic E. Kip
BY
Henry Connett
ATTORNEY

No. 674,155. Patented May 14, 1901.
W. H. BAKER & F. E. KIP.
WEFT REPLENISHING MECHANISM FOR LOOMS.
(Application filed Apr. 23, 1900.)
(No Model.) 7 Sheets—Sheet 2.

WITNESSES:
J. W. Wiman
Peter A. Ross

INVENTORS:
William H. Baker
Frederic E. Kip
BY
Henry Connett
ATTORNEY

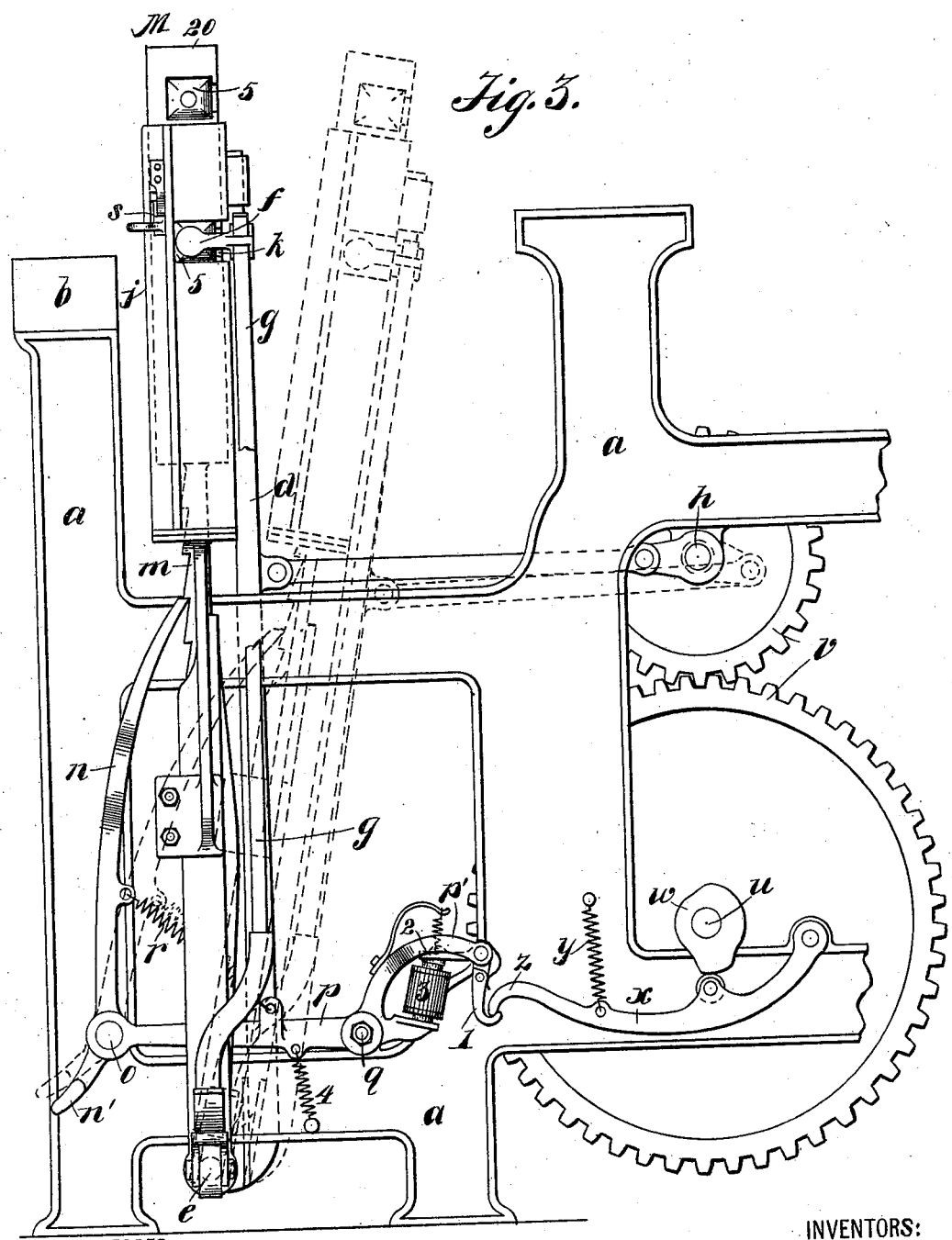

No. 674,155. Patented May 14, 1901.
W. H. BAKER & F. E. KIP.
WEFT REPLENISHING MECHANISM FOR LOOMS.
(Application filed Apr. 23, 1900.)
(No Model.) 7 Sheets—Sheet 4.
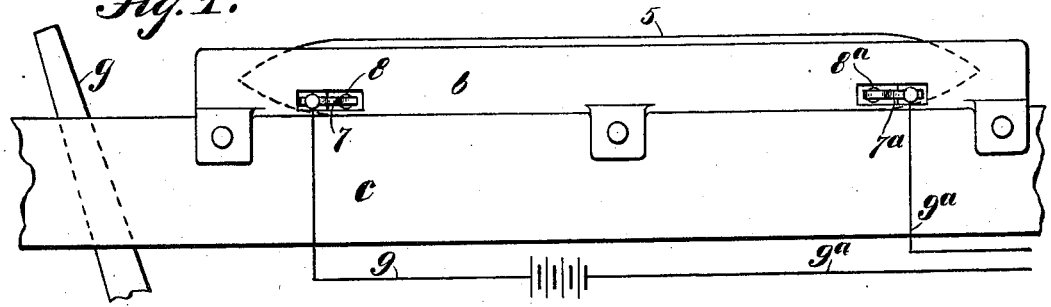
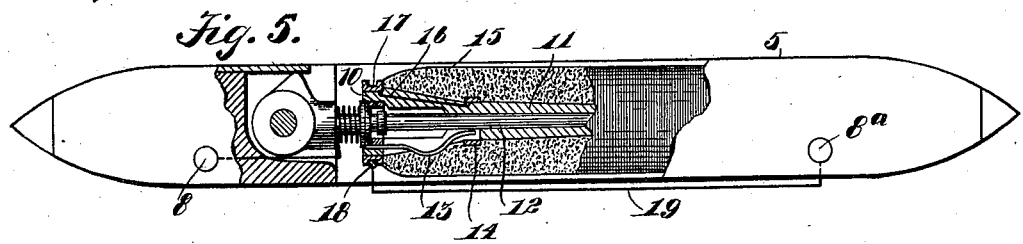
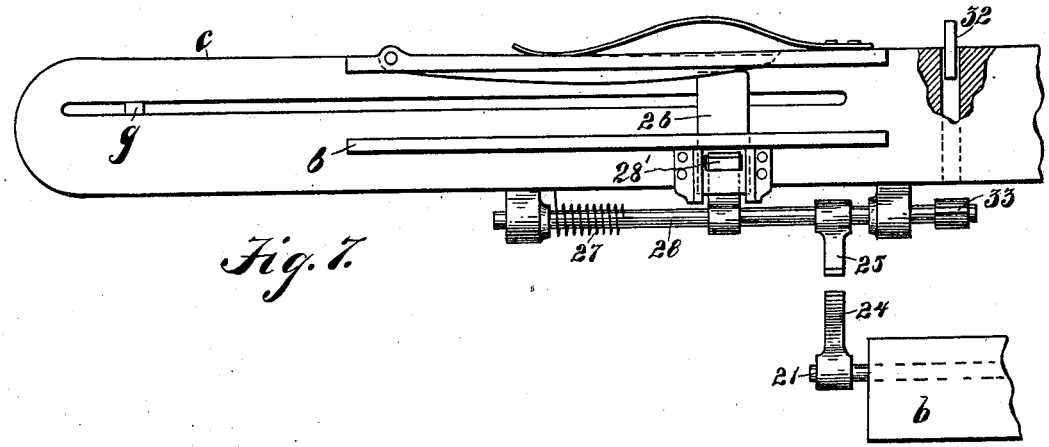
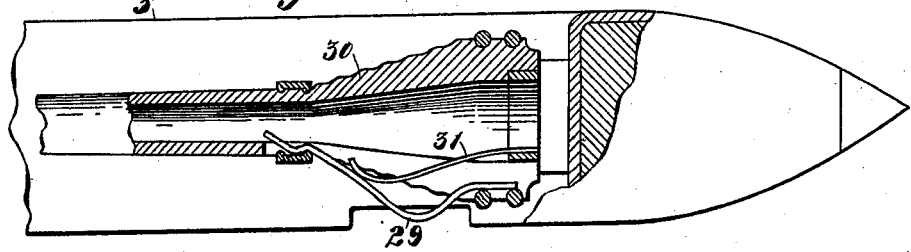
WITNESSES:
J. W. Wiman
Peter R. Ross
INVENTORS:
William H. Baker
Frederic E. Kip
BY
Henry Connett
ATTORNEY
THE NORRIS PETERS CO., PHOTO-LITHO., WASHINGTON, D. C.

No. 674,155. Patented May 14, 1901.
W. H. BAKER & F. E. KIP.
WEFT REPLENISHING MECHANISM FOR LOOMS.
(Application filed Apr. 23, 1900.)
(No Model.) 7 Sheets—Sheet 5.

No. 674,155. Patented May 14, 1901.
W. H. BAKER & F. E. KIP.
WEFT REPLENISHING MECHANISM FOR LOOMS.
(Application filed Apr. 23, 1900.)
(No Model.) 7 Sheets—Sheet 6.
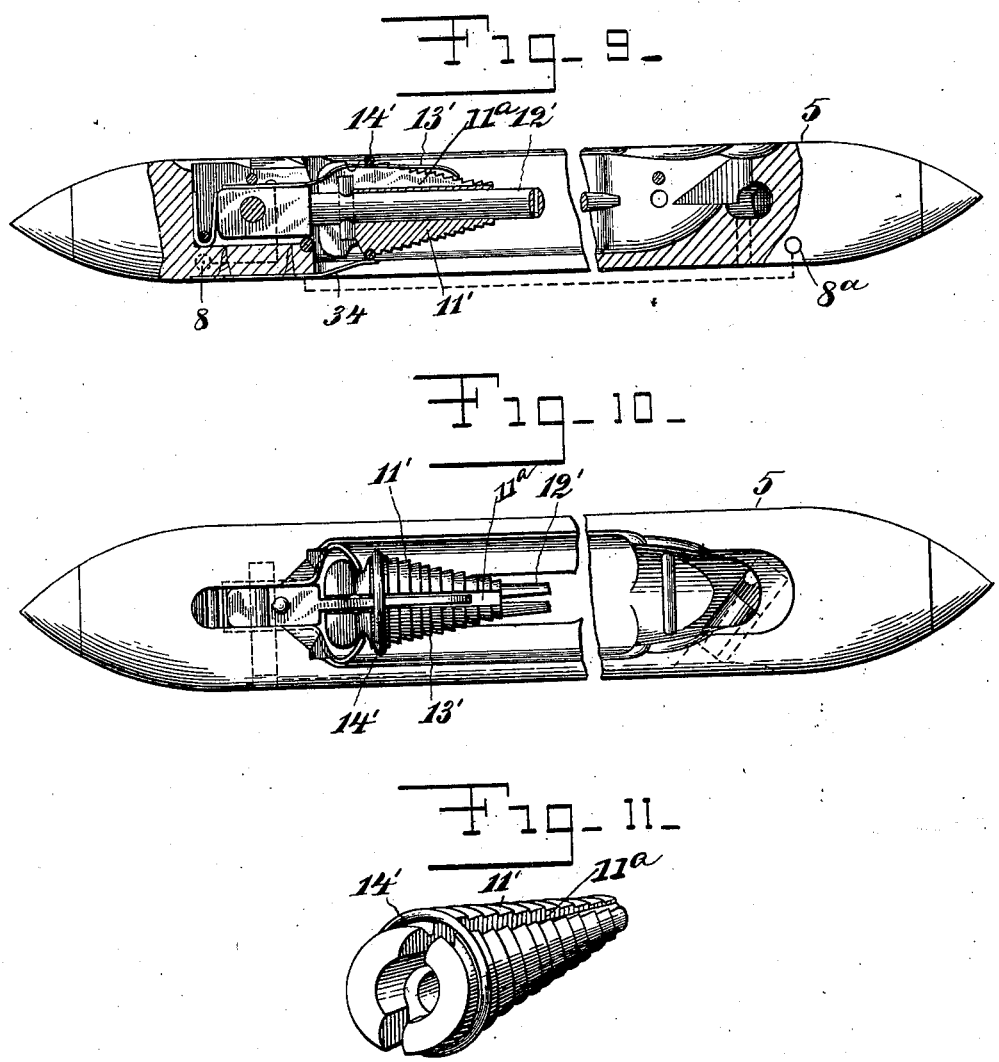

No. 674,155. Patented May 14, 1901.
W. H. BAKER & F. E. KIP.
WEFT REPLENISHING MECHANISM FOR LOOMS.
(Application filed Apr. 23, 1900.)
(No Model.) 7 Sheets—Sheet 7.

WITNESSES:
INVENTORS.
William H Baker
Frederic E. Kip
BY
Henry Connett
ATTORNEY

UNITED STATES PATENT OFFICE.

WILLIAM H. BAKER, OF CENTRAL FALLS, RHODE ISLAND, AND FREDERIC E. KIP, OF MONTCLAIR, NEW JERSEY.

WEFT-REPLENISHING MECHANISM FOR LOOMS.

SPECIFICATION forming part of Letters Patent No. 674,155, dated May 14, 1901.

Application filed April 23, 1900. Serial No. 13,838. (No model.)

*To all whom it may concern:*

Be it known that we, WILLIAM H. BAKER, residing at Central Falls, Providence county, Rhode Island, and FREDERIC E. KIP, residing at Montclair, Essex county, New Jersey, citizens of the United States, have invented certain new and useful Improvements in Weft-Replenishing Mechanism for Looms, of which the following is a specification.

This invention relates to shuttle changing or feeding mechanism for looms, or to what are commonly called "automatic weft or filling supplying mechanisms," wherein the shuttles are changed when the weft or filling in the shuttle in play is substantially exhausted.

In the present construction the full shuttles are contained in superposed and connected shuttle-boxes, forming a magazine or shuttle-feeder which is adapted to be moved up and down in guides at one side of the loom, so as to bring the boxes of the series successively to the level of the raceway for picking, and this magazine is operated by a cam device in the loom, the times of operation thereof being controlled by the presence or absence of weft or filling in the shuttle or weft-carrier in play.

Figure 1:
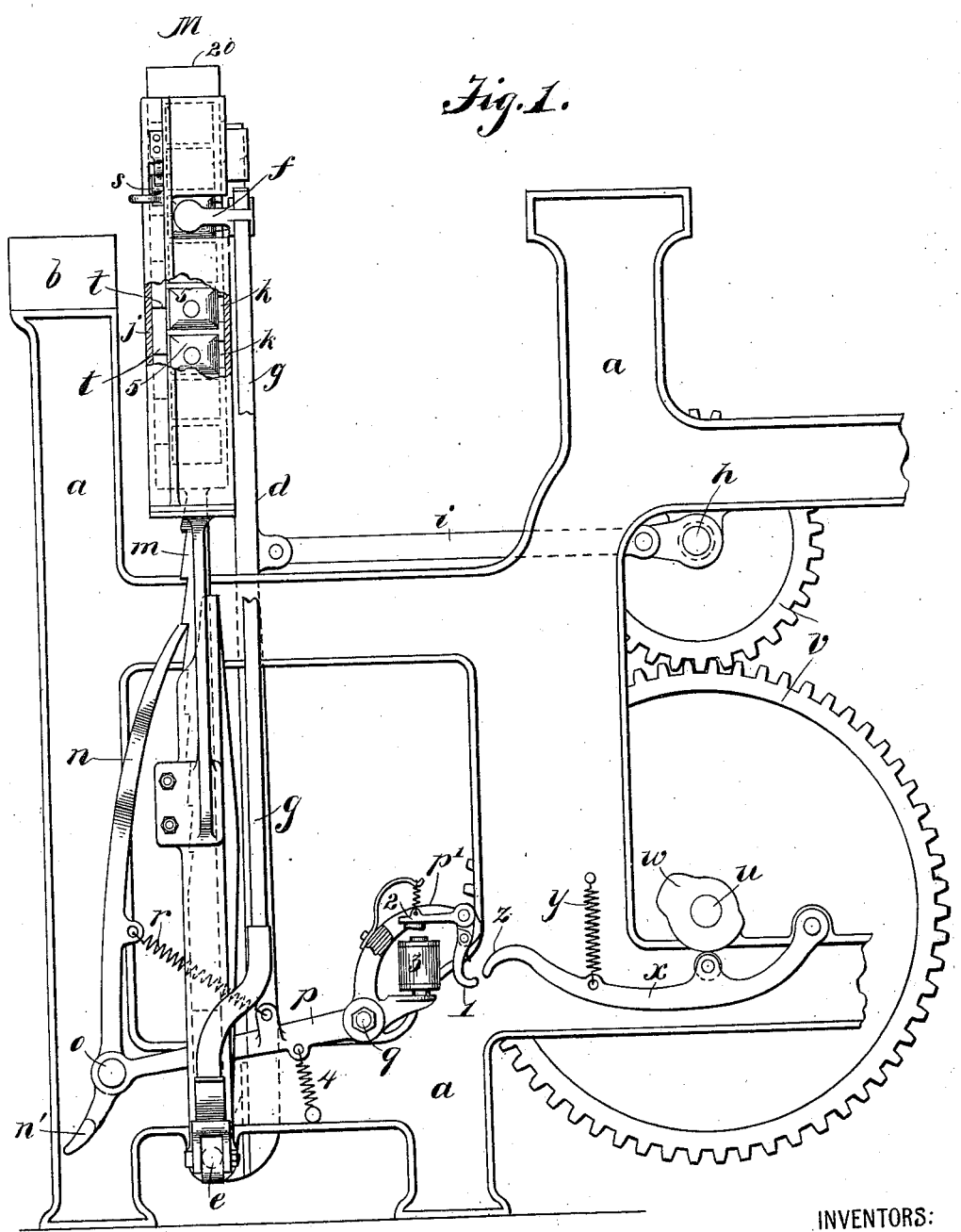
Figure 2:
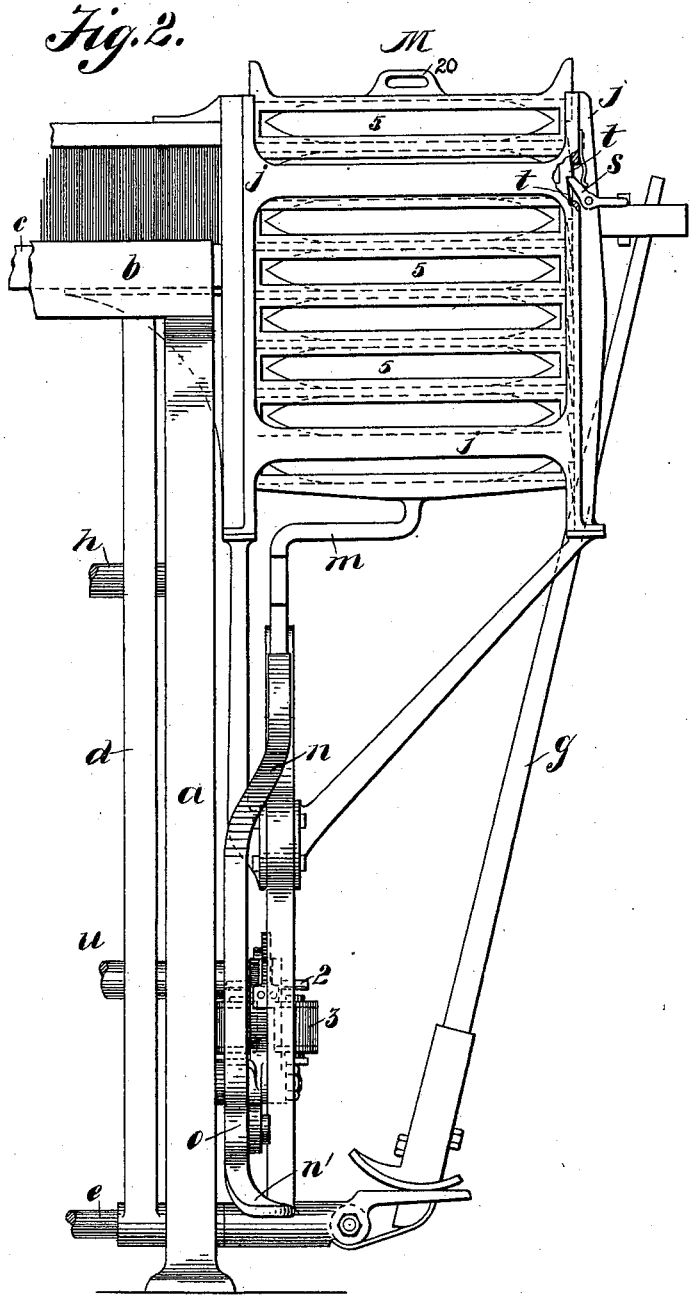
Figure 6:
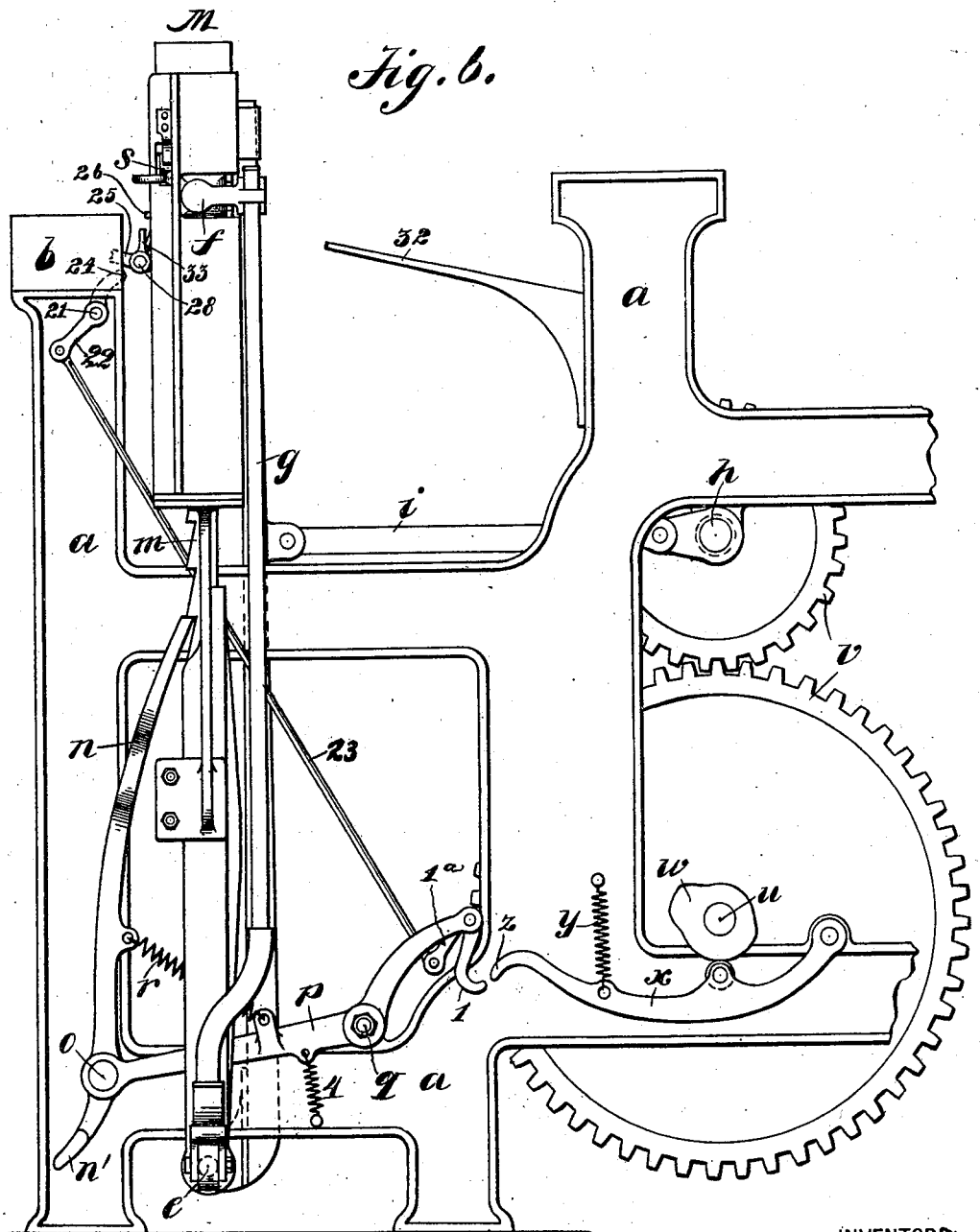
Figure 12:
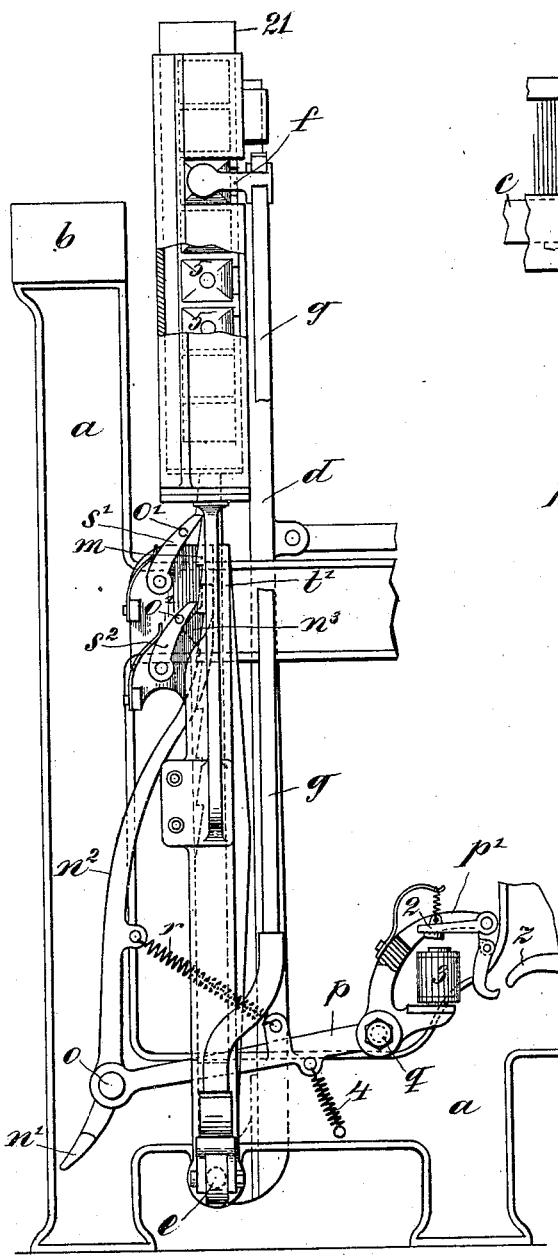
Figure 13:
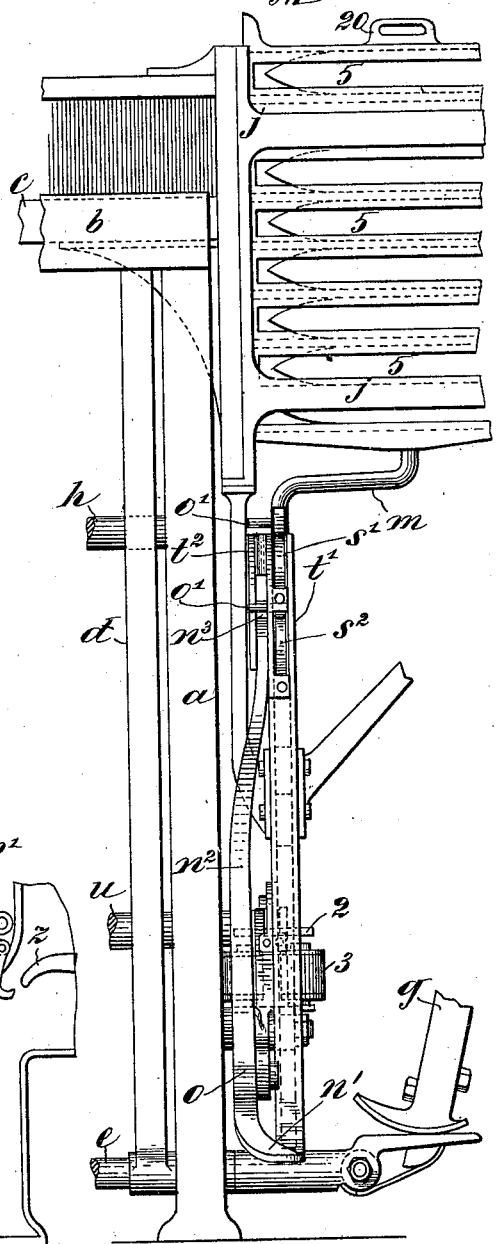

In the accompanying drawings, which illustrate an embodiment of the invention, Figure 1 is a side elevation of that part of a loom where the shuttle-magazine is situated, and Fig. 2 is a front elevation of the same. Fig. 3 shows the parts seen in Fig. 1, but in a different position. Fig. 4 is a front view of the shuttle-box at the opposite side of the loom from the magazine, showing the electrical connections. Fig. 5 is a sectional view of one form of the shuttle and inclosed weft-holder. Fig. 6 is a view similar to Fig. 1, but illustrating the employment of a mechanical controlling device. Fig 7 is a plan of the mechanical feeler device; and Fig. 8 is a sectional view of the shuttle, showing the radially-movable indicator. Figs. 9, 10, and 11 are detail views of the preferred form of shuttle and weft-holder to be used where the operation of the weft-feeding mechanism is controlled electrically. In these views, Fig. 9 is a longitudinal section of the shuttle, and Fig. 10 is a plan, and Fig. 11 is a view, of the butt-cop detached. Figs. 12 and 13 are respectively views similar to Figs. 1 and 2, illustrating a modified form of the magazine-operating mechanism.

Referring primarily to the principal views illustrating a loom having magneto-electrical controlling devices, $a$ is the loom-frame; $b$, the breast-beam, forming a part thereof. $c$ is the lay. $d$ represents the lay-swords. $e$ is the swing-rail. $f$ is the picker. $g$ is the picker-stick. $h$ is the crank-shaft, from which the lay is vibrated, and $i$ is a connecting-rod between the lay and a crank in the shaft $h$. In a general way these parts are all well known in looms and will require no further description.

Mounted in an upright guide $j$, carried by the lay, is a shuttle-supplying magazine, (designated as a whole by M,) comprising a series of connected and like superposed shuttle-boxes $k$, either one of which may be brought to the level of the raceway on the lay by raising or lowering the magazine. The magazine M is supported on a stem $m$ in the form of a ratchet-rack, the teeth on which correspond in number to the shuttle-boxes $k$ and in distance apart to the height of one of said boxes. As a means for elevating the magazine at proper times to bring the next box $k$ below up to the raceway a lifting-pawl $n$ is employed. This pawl is coupled at $o$ below to one arm of the lever $p$, which is fulcrumed at $q$ on the loom-frame, and the upper operative end of the pawl is held up into engagement with the teeth on the rack-stem $m$ by means of a spring $r$. Obviously by properly rocking said lever $p$ the pawl $n$ will be caused to elevate the magazine M. When the latter shall have been elevated, it will be supported by a pawl $s$, Figs. 1 and 2, which engages one of a series of teeth or shoulders $t$ on the end of the magazine. The teeth $t$ are spaced the same as the teeth on the stem $m$. In order to rock the lever $p$ at the proper time to elevate the magazine, we prefer to employ means somewhat similar to that illustrated in our United States Patent No. 637,753, dated November 21, 1899. This device comprises a cam-shaft $u$ in the loom, driven from the crank-shaft $h$, and at one-half the speed of said shaft, through gear-wheels $v$. On the shaft $u$ is fixed a suitably-shaped cam $w$, which acts to variably depress at proper times an operating cam-lever $x$, fulcrumed on the loom-frame and upheld by a spring $y$. At its free end $z$ this lever $x$ has a somewhat hooked form. Normally the hooked end $z$ of the lever $x$ plays up and down out of contact with a hook 1, pivotally mounted on the shorter arm $p'$ of the lever $p$. On a branch of the hook 1 is an armature 2 of an electromagnet 3, carried by the lever $p$, and when this magnet is excited it attracts its armature, and thus rocks the hook 1 in a manner to swing it into the path of the hooked extremity $z$ of the cam-lever, whereby on the next depression of the lever $x$ the hooked extremity $z$ thereof will engage the hook 1 and rock the lever $p$ in a manner to elevate the magazine M. When the cam $w$ passes, the spring $y$ will elevate the lever $x$ and disengage it from the hook 1, thus allowing the lever $p$ and pawl $n$ to descend to their normal positions. The lever $p$ may be drawn down by a spring 4.

The means whereby a shuttle 5, when the bobbin or weft-holder therein is nearly exhausted of weft or filling, serves to complete an electric circuit through the magnet 3 is illustrated in Figs. 4 and 5. Fig. 4 shows the shuttle-box 6 on the lay at the opposite side of the loom from the magazine M and represents it as provided with electric spring-contact terminals 7 and $7^a$, as illustrated in our before-mentioned patent. When the shuttle 5 enters the box 6, contact-plates 8 and $8^a$ on the side of the shuttle, Fig. 5, are put into contact with the terminals 7 and $7^a$, respectively, thereby closing the circuit 9 $9^a$ on the loom, with a part thereof in the shuttle and seen in Fig. 5. This figure of the shuttle illustrates a construction showing how the breaking and closing of this circuit is effected or may be effected by the presence or substantial absence of weft or filling in the shuttle. The construction is clearly illustrated in our aforesaid patent, but will be briefly described here. The contact-plate 8 is connected electrically with an inner metal piece or ring 10 in the end of the bobbin 11, which is slipped onto a spindle 12, hinged in a well-known way in the shuttle, and connected with the ring 10 is a spring-contact 13, the free end of which is held out of contact with a metal ring or piece 14 on the bobbin by the overwrapped weft 15. The ring 14 is electrically connected by an insulated conductor 16 with an outer circumferentially-grooved metal ring 17 on the butt-end of the bobbin, and when the bobbin is in place, as in Fig. 5, the groove in the ring 17 engages a metal pin or bar 18 in the shuttle, which is in electrical connection by a suitable insulated conductor 19 with the other contact-plate $8^a$. When the weft or filling 15 is nearly exhausted, the contact 13 is allowed to spring outward into contact with the ring 14, so as to close the circuit within the shuttle, and then when the shuttle 5 enters the box 6 the circuit will be completed through the magnet 3. Now it will be noted that this completing of the circuit through the magnet 3 must occur at the moment the shuttle enters the box 6 and that this must take place when the lay is swung back or is at what is called the "picking" point or position, and in order that there may be no failure arising from an accidental breaking of the closed circuit by the jarring of the loom the cam $w$ should be or may be so set that when the shuttle enters the box 6 the hook $z$ on the cam-lever $x$ will be just in position to engage the hook 1 at the instant the latter is thrown outward by the excitation of the magnet; but the cam $w$ will be of such form that it will merely cause the hooks $z$ and 1 to engage and hold them in engagement until the lay shall have beaten up the shot, swung back again to the picking position, and the nearly-exhausted shuttle shall have been picked from the box 6 and driven through the shed into its box in the magazine M. Then the cam $w$ will act quickly to rock the lever $p$ and through the pawl $n$ lift the magazine, thus bringing a fresh shuttle into play and elevating the box containing the substantially exhausted shuttle above the level of the raceway. Fig. 3 shows in full lines the cam $w$ in the act of lifting the magazine. The dotted lines show the lay at the picking-point. Fig. 1 shows the normal situation of the parts with the lay in the beat-up position. When the bottom or last shuttle is exhausted, the operator removes the exhausted shuttles and replaces them by full ones. This is effected by lifting out the magazine. It may be replaced by one charged with full shuttles, which is set in the top of the guide $j$. He may then lower the magazine by pressing back the pawl $n$ with his foot, said pawl being provided with a toe-piece $n'$ for this purpose, and by pressing back at the same time the pawl $s$ with one hand, while he grasps the handle 20 on the magazine with the other hand.

Figs. 6, 7, and 8 illustrate a construction which is the same in substance as that already described except that the control is mechanical instead of electrical. The mechanical device employed may be similar to or like that illustrated and described in our pending application, Serial No. 4,221, filed February 6, 1900, and therefore will not require a very minute description herein. In the loom-frame is mounted a shaft 21, extending transversely of the loom, and on the end of this shaft which is at the side where the lever $p$ is situated there is an arm 22, which is coupled by a rod 23 to an arm $1^a$ on the hook 1, which corresponds substantially to the armature-carrying arm seen in Fig. 1. Of course no magnet is employed in the construction we are now describing. On the other end of the shaft 21, which is at the same side of the loom with the shuttle-box 6, Fig. 7, is another arm 24, which is called the "tappet-arm," as it is adapted to be impinged upon, when the lay beats up, by a tappet 25, carried by the lay, in case the shuttle in the box 6 is substantially exhausted of weft or filling, and thus rock the shaft 21 and cause the arm 22 thereon to act through the rod 23 to swing out the hook 1 into the path of the hook $z$ on the cam-lever $x$. The tappet 25 is normally held up so as to pass over the arm 24 by reason of the fact that a horizontally-reciprocating feeler 26 on the lay is passed freely into the shuttle-box and shuttle by a spring 27 on a rock-shaft 28, which carries the tappet 25 and actuates the feeler 26; but in the bobbin in the shuttle 5 is a radially-movable spring-indicator 29, Fig. 8, which when the weft is substantially exhausted springs down into the path of the feeler and does not permit the latter to enter so far, thus preventing the tappet 25 from rising high enough to clear the tappet-arm 24. This indicator is seen in Fig. 8, which shows the bobbin 30 in section. The indicator 29 is hinged in a slot in the bobbin and is backed by a spring 31. It is adapted to be held back out of the path of the feeler by the overwrapped weft or filling on the bobbin. In order to withdraw the feeler from the shuttle-box at the picking-point, so that the shuttle may enter and pass out freely, there is a fixed dagger 32 on the loom-frame, Fig. 6, which when the lay recedes to the picking position passes through an aperture in the lay and impinges upon an upright arm 33 on the rock-shaft 28 and rocks the latter, so as to withdraw the feeler; but when the lay beats up this dagger is relatively withdrawn, as will be readily understood. The rock-shaft 28 actuates the feeler 26 through the medium of an arm 28', which engages an aperture in the feeler.

The preferred form of shuttle where electrical control is employed is illustrated in Figs. 9, 10, and 11. In this construction the spring-contact device is carried by the spindle in the shuttle, and the weft-holder (in this case a butt-cop) has a slot, elongated depression, or recess 11$^a$ to receive said contact when the cop is slipped onto the spindle. The spindle 12' is hinged in the shuttle and carries the spring-contact 13'. This contact is connected electrically with the contact-plate 8 on the shuttle. The weft-holder 11' has on it a metal ring 14', which crosses a longitudinal slot in the holder. When the weft-holder is slipped on the spindle, the spring-contact 13' enters said slot under the ring 14' under the overwrapped weft on the holder, and when the spindle is snapped down in place the ring 14' is pressed into elastic contact with a metal spring 34 on the shuttle. This spring 34 is connected electrically with the other contact-plate 8$^a$ on the shuttle. The electrical conductors employed may be constructed in any manner known to electricians. When the weft becomes exhausted to a sufficient extent, the contact 13' will spring outward and close the circuit by coming in contact with the ring 14'. This construction by removing the spring-contact 13' from the weft-holder avoids the difficulty which arises from the centrifugal force in winding the weft on the bobbin or cop, forcing said spring outward, so that it cannot be held down by the weft.

As the magazine M rests in its guide by its own weight and is to be lifted out for the removal of the empty shuttles and for refilling, it is not necessary that it be actually secured to its supporting-stem $m$, this stem being merely for lifting it, nor is it important just where the teeth or shoulders $t$ are placed, so long as they support the magazine with the respective shuttle-cells properly alined with the raceway for picking.

By "weft-holder" or "bobbin" as the terms are herein employed is meant any means of holding weft or filling in a shuttle or weft-carrier. The means shown herein whereby the times of operation of the supplying or replenishing mechanism are controlled and selected through the exhaustion of weft in the shuttle will prove satisfactory; but there are other known means for the purpose which may be employed as well. By "absence" or "substantial absence" and "exhaustion" or "substantial exhaustion" of weft or filling in the shuttle in play as herein expressed is meant such a degree of exhaustion of said weft or filling as will allow the exhaustion-indicating device to perform its functions without making an imperfection in the cloth.

We have herein illustrated the shuttle-feeder as moving up to supply. It will, however, be quite obvious that it is immaterial to our invention whether the magazine or feeder is moved up or down to supply the picking-point or raceway with a shuttle containing a new supply of weft in place of that substantially exhausted. For example, in Figs. 12 and 13 we have shown how this may be effected. In these views there are two spring-pawls $s'$ and $s^2$, one above the other and adapted to engage the teeth on the stem $m$ of the magazine M; but these pawls, which are mounted on a guide $t'$, in which said stem plays, are so spaced that when the upper one $s'$ engages below a tooth the other will extend slightly over and rest on the next tooth below. The part corresponding to the lifting-pawl $n$ of Fig. 1 is in this modified construction a pawl-lifter $n^2$, having on its upper end, which plays in a groove $t^2$ in the guide $t'$, a lifting-cam $n^3$, adapted when the lifter is moved up and down to take successively under studs $o'$ on the pawls and lift them out of engagement with the teeth on the stem $m$. The operation is simple. When the lever $p$ is rocked by the cam $w$ and the cam $n^3$ moves upward, it lifts and lets fall the inoperative lower pawl $s^2$ and then lifts the upper operative pawl $s'$. The magazine then falls nearly to the extent of one tooth on the stem $m$ until the lower pawl engages. This drop will suffice to bring the full shuttle in the cell to the picking-level. In its descent the cam $n^2$ first trips the upper and now inoperative pawl and next trips the lower and now operative pawl, so as to permit the magazine to descend a little farther and put the upper pawl into engagement. This last drop of the magazine need not exceed one-eighth of an inch. Indeed, it may be even less. In this construction the supporting-pawl and ratchet $s\ t$ will not be required.

The electrical or other controlling devices are herein shown for convenience as situated at the shuttle-box at the side of the loom opposite to the magazine or shuttle-feeder; but this disposition is not essential to our invention.

It will be understood that this invention does not require a "two-speed" movement of the loom—that is, the normal rapid movement and a relatively slow movement during the shifting of the magazine—as in some weft-supply mechanisms, and that it is not necessary that the weft should absolutely fail before a change of shuttles can be effected. Indeed, the breakage of the weft-thread merely serves, as in most looms, to stop the loom, but not to provide a new supply of weft.

Having thus described our invention, we claim—

1. In a loom, the combination with the vibrating lay, guides for the magazine, carried by the lay, the magazine, and the stem carrying the same, provided with teeth, of a lever-and-pawl device for operating said magazine step by step, mechanism operating synchronously with the lay for actuating said lever-and-pawl device at proper times, means for supporting the magazine when it is at rest, and automatic means, controlled by the presence or absence of weft in the shuttle in play for setting in operation said magazine-operating mechanism.

2. In a loom, the combination with the upright guide for the magazine, the said magazine mounted slidably in said guides and consisting of a plurality of connected, superposed shuttle-boxes, and provided with a series of ratchet-teeth $t$, and a rack-stem $m$, of the supporting-pawl, $s$, the pawl device for elevating the magazine, and automatic means, controlled by the presence or absence of weft in the shuttle in play, for actuating said magazine-elevating mechanism.

3. In a loom, the combination with a vertically-slidable magazine provided with a ratchet, the guide in which the magazine plays, and a manually-operated pawl engaging the ratchet on the magazine, of the stem supporting the magazine, provided with ratchet-teeth, and the lifting-pawl engaging the teeth on said stem, said lifting-pawl being provided with a toe-piece whereby it may be moved out of engagement when lowering the magazine.

4. In a loom, a shuttle having contact-plates at its outer surface, a hinged spindle, and two contact-springs, electrically connected with the respective contact-plates, of a weft-holder to slip on said spindle, said holder having in it a longitudinally-extending slot adapted to receive one of said contact-springs when the holder is slipped onto the spindle, and being provided with a metal contact-band bridging said slot and adapted to contact with both of said contact-springs when the weft-holder is exhausted of weft.

5. In a loom, a shuttle having a spindle, a spring-contact 13' carried thereby and in electrical contact with a contact-plate on the shuttle, and a spring 34, in combination with a weft-holder to slip on said spindle, said weft-holder having a slot $11^a$ to receive the spring-contact on the shuttle and a ring which makes contact with the spring 34, and which is held out of contact with said ring by the overwrapped weft.

In witness whereof we have hereunto signed our names, this 9th day of April, 1900, in the presence of two subscribing witnesses.

WILLIAM H. BAKER.
FREDERIC E. KIP.

Witnesses:
F. D. DIMAN,
PETER A. ROSS.